UNITED STATES PATENT OFFICE.

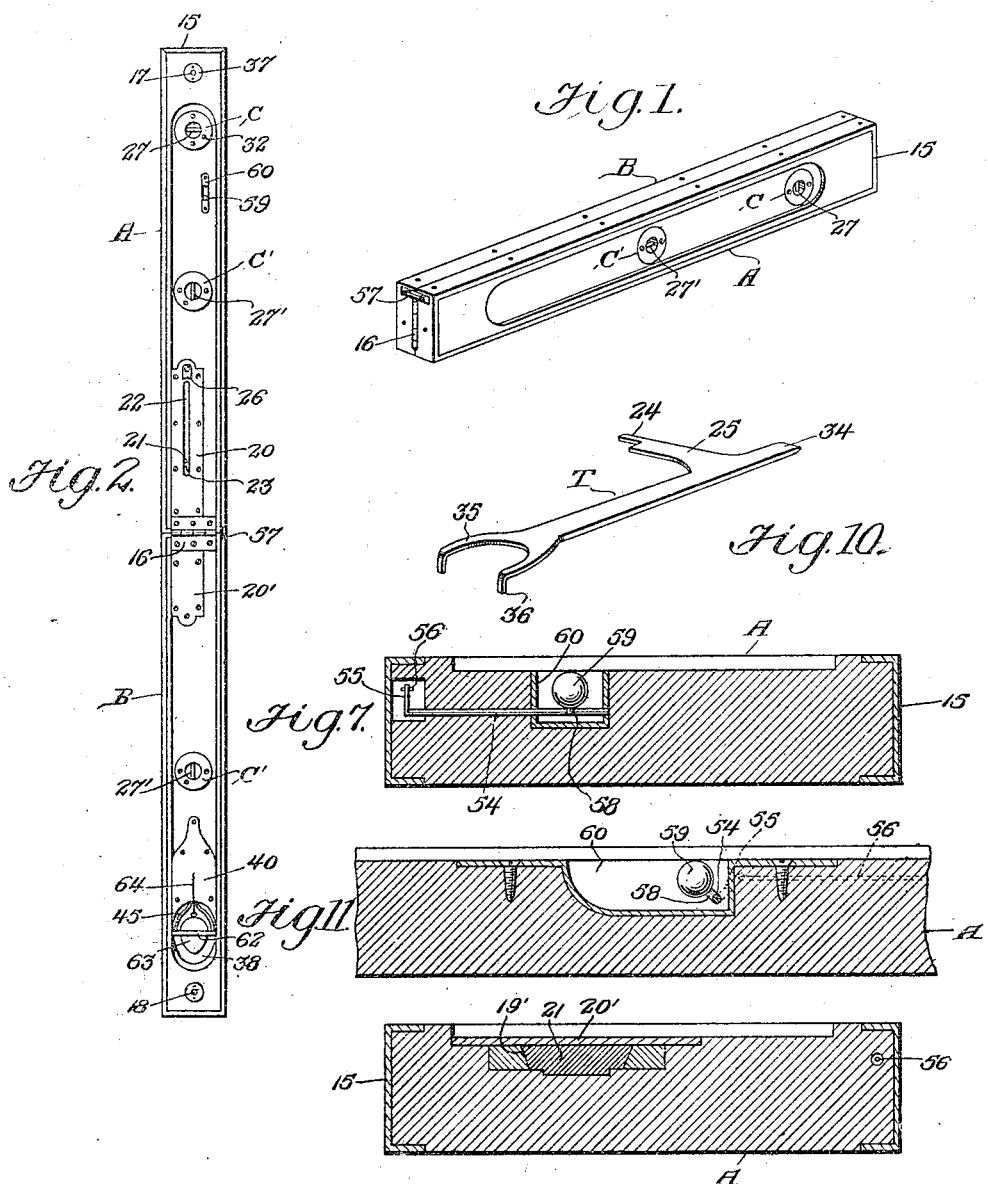

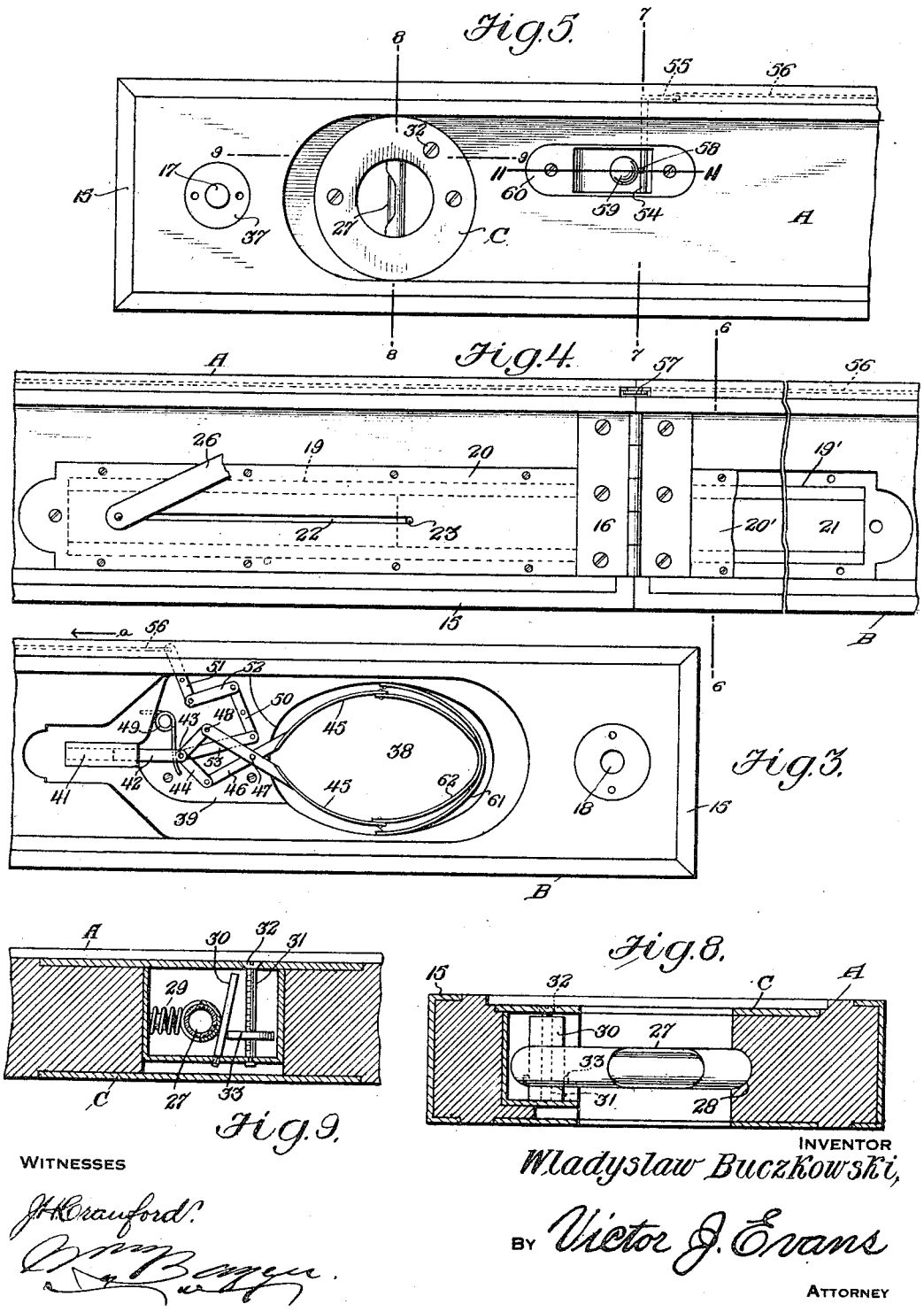

WLADYSLAW BUCZKOWSKI, OF BUFFALO, NEW YORK.

COMBINED LEVEL AND PLUMB.

1,256,435.	Specification of Letters Patent.	Patented Feb. 12, 1918.

Application filed February 24, 1917. Serial No. 150,798.

*To all whom it may concern:*

Be it known that I, WLADYSLAW BUCZKOWSKI, a citizen of the United States, residing at Buffalo, in the county of Erie and State of New York, have invented new and useful Improvements in Combined Levels and Plumbs, of which the following is a specification.

This invention relates to leveling devices, and it has particular reference to a combined level and plumb of simple and improved construction and which may be conveniently folded into small compass.

One object of the invention is to produce a level having a supporting device for a plumb bob and means whereby the latter may be held and steadied during the operation of plumbing so as to avoid the necessity for the operator stooping over in order to steady the plumb bob with his hand.

A further object of the invention is to simplify and improve the detailed construction of the plumb bob steadying device.

A further object of the invention is to produce simple and improved means for properly steadying the level glass or spirit glass, as it is sometimes called, and for properly correcting the position thereof when in any way deflected from its proper position.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a perspective view showing the improved device folded.

Fig. 2 is a top plan view showing the device extended for operation, parts having been broken away to expose subjacent parts.

Fig. 3 is a plan view on a larger scale of the lower portion of the device with parts broken away to show the plumb bob steadying device and the operating means for the same.

Fig. 4 is a similar view of an intermediate part of the device.

Fig. 5 is a similar view of the top portion of the device.

Fig. 6 is a transverse sectional view taken on the line 6—6 in Fig. 4.

Fig. 7 is a sectional detail view taken on the line 7—7 in Fig. 5.

Fig. 8 is a sectional detail view taken on the line 8—8 in Fig. 5.

Fig. 9 is a sectional detail view taken on the line 9—9 in Fig. 5.

Fig. 10 is a perspective view showing a key or wrench whereby certain parts of the device may be operated.

Fig. 11 is a sectional detail view taken on the line 11—11 in Fig. 5.

Corresponding parts in the several figures of the drawings are denoted by like characters of reference.

The improved level is composed of two major parts A and B of which the part A will be regarded as the upper and the part B as the lower part, this being the relative positions occupied by said parts when the device is used for the purpose of plumbing. The said parts A and B may be constructed mainly of wood but they are preferably bound with brass edges 15 to insure strength and accuracy to the said parts each of which, in a full size implement, is intended to be about thirty inches long by four inches wide (although the dimensions may be varied to any desired extend) and are connected together at their meeting ends by a suitably constructed hinge 16 which will enable one of the parts to be folded flat on the other. The part or member A is provided on the face thereof near its free end with a stud or projection 17 for the reception of which a socket 18 is provided near the free end of the lower section, said stud or projection and socket being adapted to interlock so as to prevent any tendency to lateral movement of the free ends of the respective parts. The stud or projection, however, serves an additional important purpose as will be presently described.

For the purpose of maintaining the parts or members A and B rigidly in position with respect to each other when the device is opened out for use, each of the said members is provided with a groove 19—19' constituting a guide way, each of said grooves being covered by a top plate 20—20'. Fitted for movement in the guide ways 19—19' is a slide 21 which is of such a length that when moved to its limit in an upward direction it will be accommodated wholly within the groove 19 of the member A. By pushing the slide downward to the limit of its movement it will be accommodated partly in the groove 19 and partly in the groove 19', thus constituting a rigid portion extending across the hinge and preventing the latter from flexing. The top plate 20 has a slot 22 through which a portion of the slide 21 is visible, and said slide is provided with a recess 23 which may be engaged by a prong 24 formed on a laterally extending arm 25 of a key or tool T seen in detail in Fig. 10 and which will be found convenient for the purpose of manipulating certain movable parts of the device. A pivoted cover plate 26 is provided for the slot 22.

The member A is provided near the upper end thereof adjacent to the stud 17 with a cylindrical casing C which is set in said member in such a manner as to be visible on both the inner and outer faces of said member. The casing C contains a spirit glass 27 which is set transversely of the member so as to serve as a level whereby the device may be trued when used for plumbing purposes. The particular manner of mounting the spirit glass will be best understood by reference to Figs. 8 and 9 whereby it will be seen that one end of said glass is fitted in a socket 28 in the casing C where it may have a rocking or pivotal movement. The other end of the glass is fitted between a cushion spring 29 and a rocking plate 30. Adjacent to said rocking plate is positioned a screw 31, said screw being swiveled in the casing C and having a notched countersunk head 32. The screw 31 carries a nut or traveler 33 that abuts on the rocking plate 30. It will be seen that by turning the screw to move the traveler in one direction it will tilt the rocking plate 30 against the glass, forcing the latter in the direction of the cushion spring 29 which will thereby be compressed. By turning the screw in the other direction the glass will be forced in the direction of the rocking plate by the extensive movement of the spring 29, thereby tilting the rocking plate in the opposite direction. In this simple manner the spirit glass may be accurately adjusted and its position corrected whenever it shall be desired to do so. The key or tool T is provided at one end with a bit 34 constituting a screw driver whereby the adjusting screw 31 may be conveniently turned. Said tool, it may be here stated, is also bifurcated at its opposite end to form arms 35 having prongs 36, enabling said tool to be utilized as a spanner wrench for the purpose of loosening or tightening a washer plate 37 whereby the stud 17 is retained in position.

Each of the members A and B is provided intermediate the ends thereof with an additional casing C' containing a spirit glass 27' which is mounted and arranged in the identical manner that the spirit glass 27 is mounted with the exception that it is arranged longitudinally instead of transversely of the respective members A and B. These spirit glasses constitute levels when the device is utilized for leveling purposes, and it will be noted that when it is extended for use as seen in Fig. 2, it is necessary that the two spirit glasses 27 and 27' should indicate alike, thereby producing a leveling device of exceptional accuracy.

The member B of the device is provided near the lower free end thereof with a transverse aperture 38 constituting an opening in which a plumb bob may swing. Said opening communicates with a socket or recess 39 which, being provided with a cover plate 40, constitutes a housing in which is mounted a guide 41 that receives a slide 42. Connected with the lower end of the slide 42 by a pivot member 43 are arms or toggles 44. A pair of curved steadying members 45 that project downwardly within the opening 38 are provided at their upper ends with arms 46 that cross each other and are connected with a pivot member 47 fixed in the wall of the recess 39. The free ends of the arms 46 are connected with the toggles 44 by pivot members 48. The slide 42 is actuated in a downward direction by a spring 49 by the tension of which the steadying arms or members 45 will be normally spread apart. Fulcrumed on the wall of the recess 39 are levers 50 and 51 the opposed arms of which are connected together by a link 52, one arm of the lever 50 being also connected with the slide 42 by a link 53 engaging the pivot member 43. It will be seen that by rocking the lever 51 in one direction, indicated by an arrow a, the slide 42 may be moved against the tension of the spring 49 with the result of closing the steadying arms 45 together. When pulling strain on the lever 51 is released, the spring 49 will force the slide 42 downwardly with the result of spreading the steadying arms 45 apart as will be readily understood.

Supported in a suitable bearing on the member A of the device is a rock shaft 54 having at one end a crank 55 which is connected with the lever 51 by a wire 56, said wire having a joint 57 adjacent to the hinge 16 to enable it to be folded without bending or breaking when the members A and B are closed together. The rock shaft 54 also has an arm 58 provided with a push button 59 that projects through a cover plate or escutcheon 60 so as to be readily pressed by the operator for the purpose of rocking the shaft, thereby actuating the steadying device as described.

A yoke or bail 61 is terminally pivoted on diametrically opposite sides of the opening 38 and a similar yoke or bail 62 is terminally and pivotally connected with the steadying arms 45. Both of these yokes or bails may be folded downward within the opening 38 when the device is not in use; when the device is to be utilized for plumbing, one of said bails is swung forward and the other is swung rearward with respect to the opening 38, thereby limiting the forward and rearward swinging movement of a plumb bob suspended within the opening, the lateral swinging movement of such plumb bob being limited by the walls of the opening 38. The plumb bob, which has been designated by 63, is suspended by a cord 64 from the stud 17 near the upper end of the member A.

It will be seen that when the device is used for plumbing purposes the operator, by pressing the button 59, may actuate the steadying arms 45 to seize the plumb bob between them, just as might be done by the fingers of the operator if he were to stoop down. By gradually releasing the pressure on the push button 59, the spring will move the slide 42 upward, thereby gradually releasing the bob and permitting it to swing slowly and gradually into position, thus enabling the operator to occupy himself by watching the level without necessity for stooping to an uncomfortable position.

As will be seen from the foregoing description, taken in connection with the drawings hereto annexed, I have produced a very simple and effective device for plumbing and leveling, which is so constructed that the spirit levels may at any time be corrected and fixed in a true position while the operation of the plumb bob is greatly improved and facilitated. The device when not in active use may be folded in small compass; when extended, either side thereof may be utilized as a straight edge.

Having thus described the invention, what is claimed as new is:

1. A combined plumb and level comprising two hingedly connected sections each having a guide way protected by a cover plate, said guide ways communicating with each other, a slide fitted in said guide ways, said slide being of a length exceeding that of the guide way in one section and not exceeding that of the guide way in the other section; said slide having a recess near one end thereof, and the cover plate of the long guide way having a slot through which said recess may be reached; and a pivoted cover plate for said slot.

2. In a combined plumb and level, two hingedly connected sections, means whereby said sections may be secured rigidly with respect to each other when extended for operation, a lug on the inner face of one of said members near the free end thereof, and a lug receiving socket in the inner face of the other member near the free end thereof, the last mentioned member having a plumb bob receiving opening near the lug receiving socket, in combination with a plumb bob having a suspending string attached to the lug.

3. In a combined plumb and level, two hingedly connected sections, means whereby said sections may be secured rigidly with respect to each other when extended for operation, a lug on the inner face of one of said members near the free end thereof, and a lug receiving socket in the inner face of the other member near the free end thereof, the last mentioned member having a plumb bob receiving opening near the lug receiving socket, a plumb bob suspended within the opening by suspending means attached to the lug, and means within said opening comprising pivotally connected members compressible on the plub bob for limiting the swinging movement thereof.

4. In a combined plumb and level, two hingedly connected sections, means whereby said sections may be secured rigidly with respect to each other when extended for operation, a lug on the inner face of one of said members near the free end thereof, and a lug receiving socket in the inner face of the other member near the free end thereof, the last mentioned member having a plumb bob receiving opening near the lug receiving socket, a plumb bob suspended within the opening by suspending means attached to the lug, and means within said opening for limiting the swinging movement of the plumb, said means consisting of pivotally supported bails adapted to be swung to an active and to an inactive position.

5. In a device of the class described, a member having a plumb bob receiving opening, steadying members within said opening having arms extending across each other, a pivot member on which said arms are mounted, and means for actuating the arms to spread the steadying members apart and to close them together.

6. In a device of the class described, a member having a plumb bob receiving opening, steadying members within said opening having arms extending across each other, a pivot member on which said arms are mounted, means for actuating the arms to spread the steadying members apart and to close them together, and means pivotally connected with the steadying members for limiting the swinging movement of the plumb bob in one direction.

7. In a device of the class described, a member having a plumb bob receiving opening, steadying members within said opening having arms extending across each other, a pivot member on which said arms are mounted, means for actuating the arms to spread the steadying members apart and to close them together, means pivotally connected with the steadying members for limiting the swinging movement of the plumb bob in one direction, and means pivotally connected with the walls of the plumb bob receiving opening for limiting the swinging movement of the plumb bob in another direction.

8. In a device of the class described, a member having a plumb bob receiving opening near the lower end thereof, steadying members within said opening having arms extending across each other, a pivot member on which said arms are mounted, an actuating element near the upper end of the member having the plumb bob receiving opening and connections between said actuating element and the steadying members whereby the latter may be spread apart and closed together by an operator occupying a standing position.

9. In a device of the class described, a member having a plumb bob receiving opening, steadying members within said opening having arms extending across each other, a pivot member on which said arms are mounted, and means for actuating the arms to spread the steadying members apart and to close them together, said means including a spring actuated slide and toggles connecting said slide with the crossed arms.

10. In a device of the class described, a member having a plumb bob receiving opening, steadying members within said opening having arms extending across each other, a pivot member on which said arms are mounted, and means for actuating the arms to spread the steadying members apart and to close them together, said means including a spring actuated slide and toggles connecting said slide with the crossed arms, and means for moving the slide against the tension of its actuating spring.

11. In a device of the class described, a member having a plumb bob receiving opening, steadying members within said opening having arms extending across each other, a pivot member on which said arms are mounted, and means for actuating the arms to spread the steadying members apart and to close them together, said means including a spring actuated slide and toggles connecting said slide with the crossed arms, and means for moving the slide against the tension of its actuating spring, the plumb bob receiving opening having a bail pivotally connected with the side walls thereof and the steadying members having a bail pivotally connected with the ends thereof, said bails being movable beyond the opening to limit swinging movement of the plumb bob in opposite directions.

12. In a device of the class described, a level stock having a transverse opening, a casing fitted in such opening and having a socket in one side, a spirit glass having one end tiltably fitted in said socket, a spring supporting the free end of the spirit glass at one side thereof, and means for positively moving the free end of the spirit glass in the direction of the spring.

13. In a device of the class described, a level stock having a transverse opening, a casing fitted in such opening and having a socket in one side, a spirit glass having one end tiltably fitted in said socket, a spring supporting the free end of the spirit glass at one side thereof, a rocking plate against which the other side of the free end of the spirit glass is supported, a swiveled screw adjacent to said rocking plate, and a traveler on said screw engaging the rocking plate and adapted to actuate the latter toward and from the free end of the spirit glass.

14. In a device of the class described, a stock comprising two members hingedly connected together, said members having openings in which casings containing spirit glasses are fitted and one of said members having a plumb bob receiving opening near its free end and a socket near said opening, a lug on the inner face of the other member adapted to engage the socket and also adapted for the attachment thereto of a string carrying a plumb bob suspended within the opening in the other member, steadying means within said opening consisting of pivotally connected members having crossed arms, a pivot member supporting said arms, a longitudinally movable slide, toggles connecting said slide with the arms, a spring actuating the slide in a proper direction to spread the steadying members apart, and means for actuating the slide, said means including a rock shaft mounted on the member having the lug on which the plumb bob carrying string is suspended, said rock shaft having arms one of which is provided with a push button, and a suitable connection between the other arm and the spring actuated slide.

15. In a device of the class described, a stock comprising two members hingedly connected together, said members having openings in which casings containing spirit glasses are fitted and one of said members having a plumb bob receiving opening near its free end and a socket near said opening, a lug on the inner face of the other member adapted to engage the socket and also adapted for the attachment thereto of a string carrying a plumb bob suspended within the opening in the other member, steadying means within said opening consisting of pivotally connected members having crossed arms, a pivot member supporting said arms, a longitudinally movable slide, toggles connecting said slide with the arms, a spring actuating the slide in a proper direction to spread the steadying members apart, and means for actuating the slide, said means including a rock shaft mounted on the member having the lug on which the plumb bob carrying string is suspended, said rock shaft having arms one of which is provided with a push button, and a suitable connection between the other arm and the spring actuated slide, and adjustable means consisting of pivotally supported bails, whereby swinging movement of the plumb bob forwardly and rearwardly through the opening may be limited.

WLADYSLAW BUCZKOWSKI.

Copies of this patent may be obtained for five cents each, by addressing the "Commissioner of Patents, Washington, D. C."